US008528435B2

(12) United States Patent
Hackl et al.

(10) Patent No.: US 8,528,435 B2
(45) Date of Patent: Sep. 10, 2013

(54) POWER ASSIST ELEMENT

(75) Inventors: Thomas Hackl, Sattledt (AT); Johann Paul Hofer, Grettstadt (DE); Markus Hofer, Garsten (AT); Alexander Mueller, Altmuenster (AT); Helmut Pamminger, Voecklabruck (AT)

(73) Assignees: Miba Sinter Austria GmbH, Laakirchen (AT); Hofer Forschungs- und Entwicklungs GmbH, Garsten (AT)

( * ) Notice: Subject to any disclaimer, the term of this patent is extended or adjusted under 35 U.S.C. 154(b) by 229 days.

(21) Appl. No.: 12/737,672

(22) PCT Filed: Aug. 4, 2009

(86) PCT No.: PCT/AT2009/000300
§ 371 (c)(1),
(2), (4) Date: Apr. 15, 2011

(87) PCT Pub. No.: WO2010/015011
PCT Pub. Date: Feb. 11, 2010

(65) Prior Publication Data
US 2011/0185833 A1  Aug. 4, 2011

(30) Foreign Application Priority Data
Aug. 6, 2008  (AT) .................................. A 1217/2008

(51) Int. Cl.
*F16H 3/38*   (2006.01)
(52) U.S. Cl.
USPC ........................ 74/339; 192/53.31; 192/53.32
(58) Field of Classification Search
USPC ...................... 74/339, 340; 192/53.31, 53.32
See application file for complete search history.

(56) References Cited

U.S. PATENT DOCUMENTS

| 3,548,983 | A | * | 12/1970 | Kazuyoshi | ............... | 192/53.341 |
| 4,526,052 | A | * | 7/1985 | Hiraiwa | .......................... | 74/339 |
| 4,823,631 | A | * | 4/1989 | Kishimoto | ..................... | 74/339 |
| 5,664,654 | A | | 9/1997 | Braun | | |

(Continued)

FOREIGN PATENT DOCUMENTS

| DE | 2 243 522 | 4/1973 |
| DE | 44 44 380 | 6/1996 |

(Continued)

OTHER PUBLICATIONS

International Search Report.

(Continued)

*Primary Examiner* — Ha D Ho
(74) *Attorney, Agent, or Firm* — Collard & Roe, P.C.

(57) ABSTRACT

A power assist element for arrangement in a synchronizer hub of a transmission synchronization device includes a base body, which has a height, a longitudinal extension and a lateral extension, and which in the direction of the longitudinal extension comprises includes two opposite, distal end sections. In at least one end section a functional surface is formed, which in the installed state cooperates with the synchronizer hub. On the base body between the two distal end sections a central elevation is formed for engagement in a sliding sleeve groove on a bottom of a sliding sleeve. The central elevation includes at least one additional functional surface which can be brought into active connection with the sliding sleeve. The functional surface in the distal end section(s) is at an acute angle to the greatest longitudinal extension of the base body and oriented at an angle to the longitudinal extension.

17 Claims, 11 Drawing Sheets

(56) References Cited

U.S. PATENT DOCUMENTS

| | | | |
|---|---|---|---|
| 5,695,033 A | 12/1997 | Hiraiwa | |
| 6,443,281 B2 * | 9/2002 | Jackson et al. | 192/53.31 |
| 7,717,246 B2 | 5/2010 | Hiraiwa | |
| 2003/0006116 A1 | 1/2003 | Jackson | |
| 2004/0154892 A1 * | 8/2004 | Coxon et al. | 192/53.31 |
| 2007/0029155 A1 | 2/2007 | Hiraiwa | |
| 2008/0066568 A1 | 3/2008 | Hackl et al. | |
| 2010/0263979 A1 | 10/2010 | Pamminger et al. | |

FOREIGN PATENT DOCUMENTS

| | | |
|---|---|---|
| DE | 694 06 413 | 5/1998 |
| DE | 696 17 821 | 8/2002 |
| EP | 1 750 025 | 2/2007 |
| EP | 1 826 431 | 8/2007 |
| EP | 1 900 956 | 3/2008 |
| JP | 2006-226516 | 8/2006 |
| WO | WO 03/004892 | 1/2003 |
| WO | WO 2005/103520 | 11/2005 |
| WO | WO 2009/076691 | 6/2009 |

OTHER PUBLICATIONS

International Search Report, mailed Nov. 26, 2009.

\* cited by examiner

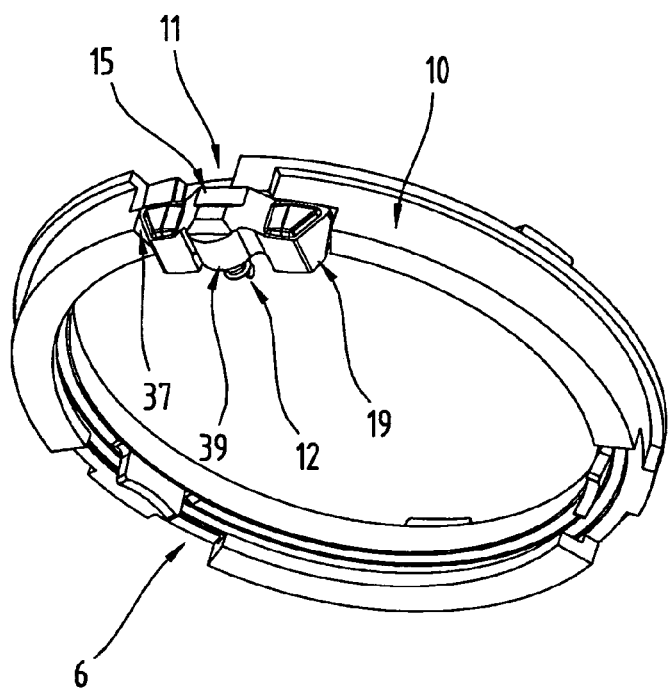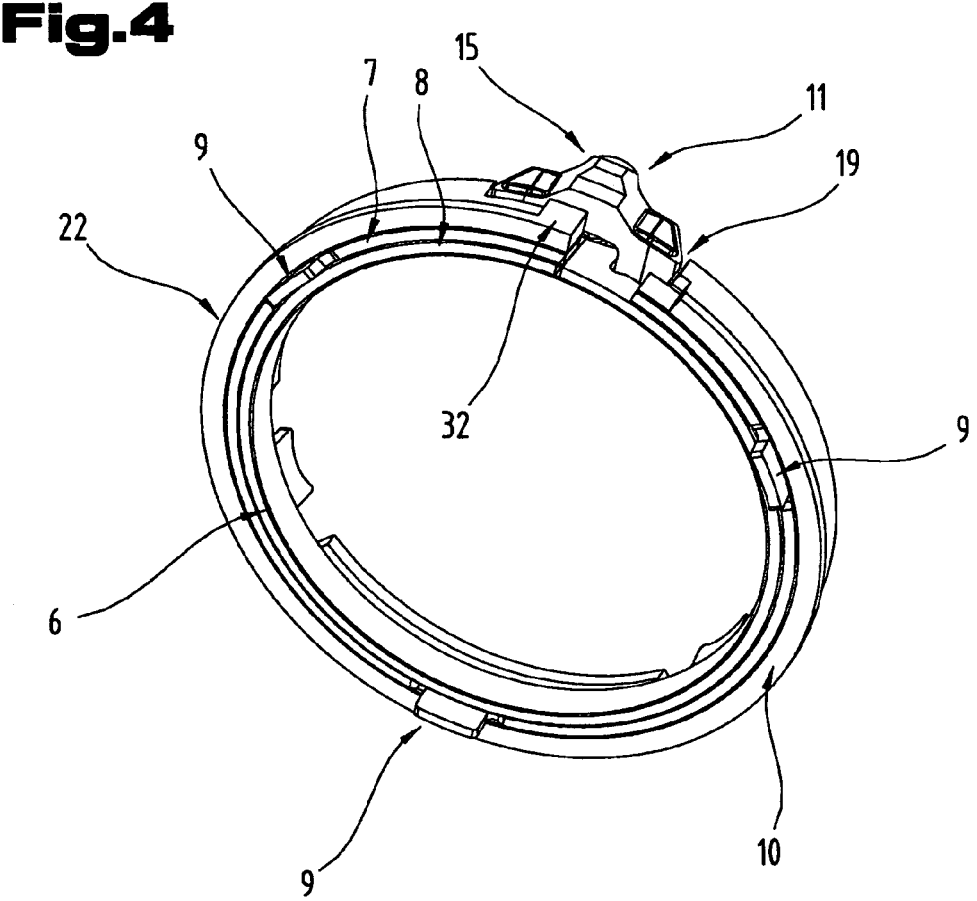

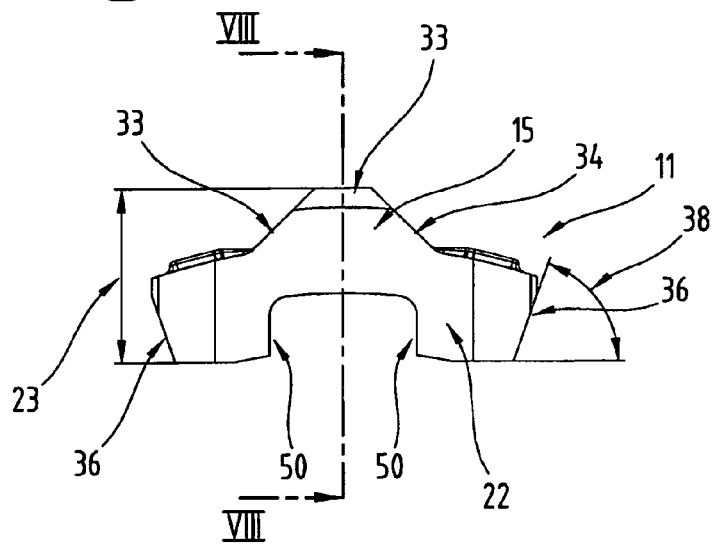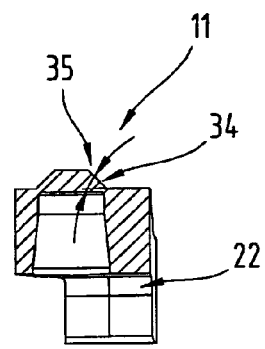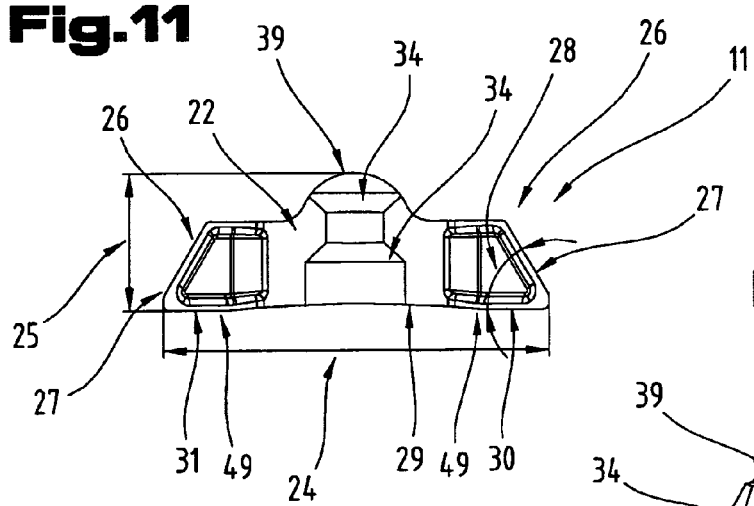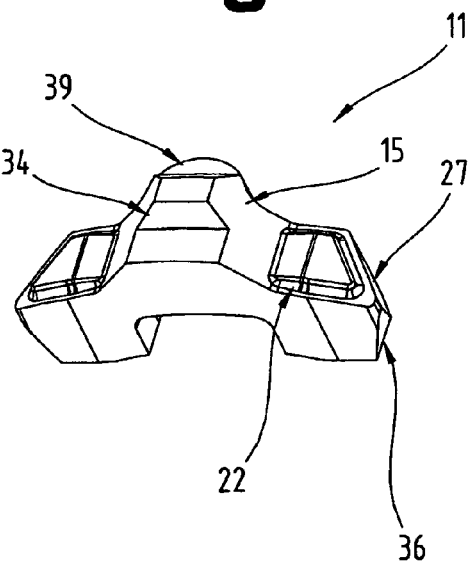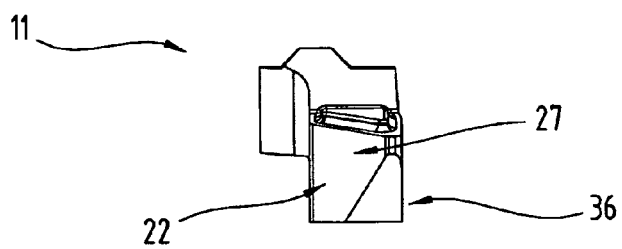

POWER ASSIST ELEMENT

CROSS REFERENCE TO RELATED APPLICATIONS

This application is the National Stage of PCT/AT2009/000300 filed on Aug. 4, 2009, which claims priority under 35 U.S.C. §119 of Austrian Application No. A 1217/2008 filed on Aug. 6, 2008, the disclosure of which is incorporated by reference. The international application under PCT article 21(2) was not published in English.

The invention relates to a power assist element for arrangement in a synchronizer hub of a transmission synchronization device, comprising a base body having a height and—as viewed in plan view—a longitudinal extension and a lateral extension, wherein the longitudinal extension in the installed state is formed or arranged in the circumferential direction of the synchronizer hub and the lateral extension is formed or arranged in the direction of the width of the synchronizer hub in axial direction, and comprising in the direction of the longitudinal extension two opposite, distal end sections, wherein in at least one end section, preferably in both, a functional surface is formed, which in the installed state cooperates with the synchronizer hub, wherein on the base body between the two distal end sections a central elevation is formed for engagement in a sliding sleeve groove on the bottom of a sliding sleeve, wherein the central elevation has at least one additional functional surface, which can be brought into operating connection with the sliding sleeve, a transmission synchronization device with at least one synchronizer hub arrangeable on a shaft, on which hub at least one synchronizer ring is arranged opposite in axial direction, at least one gear wheel arrangeable on the shaft, at least one friction packet, which is arranged underneath the synchronizer ring and is in operating connection with the latter, and with at least one sliding sleeve which can be arranged above the synchronizer hub, wherein between the gear wheel and the synchronizer ring a coupling body is arranged, and wherein the synchronizer hub comprises at least one recess, in which at least one spring-loaded power assist element is arranged, and also a locking tooth-free synchronizer ring for a transmission synchronization device with a synchronizer ring body.

In current European mass-produced transmissions mainly synchronizations of the Borg Warner type are used. Such transmissions usually comprise for each gear to be shifted an idler gear, a coupling body with a gear shift toothing and friction cone and a synchronizer ring with a counter cone and locking gear teeth and also a synchronizer hub with a connector toothing and sleeve toothing. In said synchronizer hub spring-loaded pressure parts are arranged. By means of a sliding sleeve with gear shift toothing and internal toothing for the presynchronization the latter is pushed by the shifting force together with the spring-loaded pressure parts in the direction of the gear wheel to be shifted, so that the cone surfaces of the synchronizer ring and the synchronizer cone are pressed onto one another by the pressure parts. The synchronizer ring is rotated in the synchronizer hub by the friction moment within the area of tangential play, so that the toothing of the ring and sliding sleeve are displaced relative to one another by half a toothing width. If the shifting force is greater than the presynchronization force, which is dependent on the pretensioning of the compression springs of the pressure parts, the sliding sleeve moves further until the locking toothing on the synchronizer ring and the toothing of the sliding sleeve contact one another. As long as the locking moment, resulting from the friction between the cone surfaces and the friction on the locking toothing, is greater than the restoring moment set on the basis of the pitch angle of the toothing, there is no further axial displacement of the sliding sleeve. The motor side transmission elements are accelerated or decelerated by the friction moment and in this way the main synchronization is achieved. With the synchronization of the synchronizer ring and synchronizer cone the locking torque is approximately zero, so that the locking toothing on the synchronizer ring rotates the synchronizer ring until the tooth and tooth gap are opposite one another. The toothing of the sliding sleeve slides through the locking toothing of the synchronizer ring. Then the toothing of the sliding sleeve with pitches slides on the coupling toothing on the synchronizer cone and rotates the coupling body with the idler gear until the tooth and tooth gap are opposite one another and a positive connection can be formed between the drive shaft and idler gear.

To reduce the shifting force to be applied several modification of said Borg Warner systems have already been described in the prior art.

Thus it is known from DE 696 17 821 T2 to arrange an amplifying mechanism between the synchronizer hub and a synchronizer ring, which is positioned such that it absorbs a pressure force, which is produced by the movement of the sliding sleeve to the corresponding speed changing gear wheel, and in this way amplifies and transmits the pressure force on the synchronizer ring. The amplifying mechanism consists of a pair of levers, which are divided into at least two sections in circumferential direction and comprise a plurality of lever heads. The lever heads have a beveled edge, which forms an engagement position for receiving the axial pressure force, which is caused by receiving a direct contact in connection with the movement of the sliding sleeve, and for breaking down the relevant pressure force into a radial component force, which is directed to a center, and into an axial component force. The axial component force is produced when a beveled edge provided on the inner circumferential wedge toothing of the sliding sleeve is pushed against the beveled edge of the lever head.

The possibility of increasing the power via oblique faces is documented in principle in the prior art. For example DE 22 43 522 A describes the possibility of increasing power by having a knob-like device with two oblique faces on the synchronizer ring, which device cooperates with a counter-knob device of the hub. In this embodiment however the straight end surface acts against a rectangular pressure part.

EP 1 750 025 A2 describes a further modification of the pressure parts for increasing power. The latter are in this case—as viewed in plan view—designed to be H-shaped. The end sections of said H-shaped pressure parts are provided with a cross-sectional extension, wherein the transitions between the main part of the pressure parts to the end parts are provided with oblique surfaces, which are designed to be inclined in the direction of the middle point. The synchronizer hub is also beveled in the recesses provided for mounting the pressure parts, which beveling is complementary to said oblique surfaces of the pressure part.

From EP 1 900 956 A a servo-synchronization pressure part with an I-form is known for the gear synchronization of idler gears via shifting sleeves, in particular for gear changing transmissions such as the manual transmissions of motor vehicles, which comprises tiltable fingers, preferably with one or more beveled corner sections. The sliding sleeve of the synchronization unit is provided with a radial groove, which has a conical angle, in which one end of a central elevation of the pressure part engages, in particular one end of a bearing pin, in the phase of locking up to unlocking by the pressure part for the speed adjustment between a coupling body and a sliding sleeve. Also in this embodiment the servofunctional surfaces are negative, i.e. are inclined inwardly to the middle point of the pressure part.

The objective of the present invention is to create a power assist element for a transmission synchronization device and a transmission synchronization device and also to simplify a synchronizer ring of a transmission synchronization device.

This objective of the invention is achieved by means of the aforementioned power assist element, in which the functional surface(s) in the distal end section(s) is or are inclined at an acute angle to the greatest longitudinal extension of the base body and relative to the longitudinal extension, preferably the functional surfaces are inclined in opposite direction, i.e. are inclined towards one another, in particular in mirror image, and by the formation of a transmission synchronization device with said power assist element, wherein the longitudinal extension of the power assist element in circumferential direction of the synchronizer hub and its lateral extension are aligned in the direction of the width of the synchronizer hub in axial direction, and by a locking toothing free synchronizer ring, in which the synchronizer ring body comprises at least one recess for the partial mounting of a power assist element, and in which an inner circumference is interrupted only by at least one recess, or in which the synchronizer ring body comprises at least one driver element projecting over the latter in axial direction and is free of radially downwards pointing projections, wherein lateral walls of the recess or the at least one driver element comprise at least partly beveled surfaces for application against the power assist element.

In the present invention reference is made to the plan view of a pressure part according to the invention, where one side of the pressure part is shown, in the end sections of which the servo obliques are arranged. In one angle of observation in a plan view the section determined or defined for a sliding sleeve engagement is positioned opposite the observer. In a plan view the observer is located floating above the pressure part in a position, in which the sliding sleeve engagement points towards him.

In addition to the known advantages of such amplifying power assist elements, such as e.g. the improved shifting comfort compared to Borg-Warner synchronizations, the power assist element according to the invention has the advantage that the power amplification is not influenced by wear in the friction packet of the transmission synchronization device or not substantially, as is the case e.g. in the aforementioned H-shaped power assist element. By means of such wear in the friction packet in transmission synchronizations according to the prior art the rotation becomes greater, so that the relative position of the locking toothing of the synchronizer ring to the sliding sleeve changes. With the power assist element according to the invention also more power can be transmitted with at least the same level of shifting comfort. In this way also more rapid synchronization cycles are possible. In addition, by means of the possible reduction from a triple cone design of the synchronization to a double cone design or a single cone design a reduction in the installation space is possible or with the same installation space as in the prior art a greater level of power can be transmitted. The power assist element can be made as a sintered component, so that production costs can be reduced, and also the power assist elements, which have a more complex geometry, can be produced more economically. In this way the embodiment with a larger surface area—in particular compared to the H-part from the prior art—is an advantage, as in this way the loading and thereby the wear of the power assist element can be reduced, so that additional strength-increasing measures, such as e.g. heat treatment or hardening, can be dispensed with, and also in turn the production of the power assist element becomes simpler. In addition, by means of the design of the central elevation with the additional functional surfaces it is achieved that the synchronizer ring is designed to be without locking-toothing and thus the latter can be simplified with respect to its geometry, and can be produced more cost-effectively. Owing the simplicity of the power assist element the latter can be designed to be compact, whereby its arrangement in the synchronizer hub is made possible and thus the structural height of the transmission synchronization device can be reduced. Compared to the prior art the power assist element no longer extends over at least approximately the entire width of the sliding sleeve in axial direction, but with the power assist element according to the invention there is a division into at least one front and at least one rear power assist element—relative to the sliding sleeve as viewed in axial direction—whereby a simpler geometry without cross sectional reductions caused by negatively formed functional surfaces is possible, as shown in the prior art. In this way a structurally simple and possibly more compact design of the power assist elements is possible compared to the prior art, in particular also a power assist element is possible, which only at one distal end section has a functional surface, a so-called servosynchronization oblique, in particular for the downshift function, although a design with two such functional surfaces is preferred for the downshift and upshift function. It is thus also possible that the power assist element now only projects up to about half the width of the synchronizer hub in axial direction into the latter, whereby the space required for the gear synchronization can be reduced on the one hand, and on the other hand also the power distribution can be influenced positively.

To increase the fictional moment of the friction packet comprising an inner and outer conical ring of the transmission synchronization device and also to increase the axial force, i.e. the pressing force, it is an advantage if the functional surface(s) in the distal end sections are inclined at an acute angle to the greatest longitudinal extension with an absolute value selected from a range with a lower limit of 3° and an upper limit of 89° against the longitudinal extension of the base body.

Said functional surfaces can also be inclined at an angle with an absolute value selected from a range with a lower limit of 15° and an upper limit of 70° or with a lower limit of 45° and an upper limit of 60° relative to the longitudinal extension of the base body.

With regard to the angle it should be noted that since in principle only one functional surface is necessary for one shifting direction, in particular for the downshift function, the angles of the two functional surfaces can also differ, i.e. also asymmetrical embodiments of the power assist element are possible.

The surface pressure of the amplification can be improved further in that the functional surface(s), in particular those at the distal end section(s), have a size which is selected from a range with a lower limit of 5 mm$^2$ and an upper limit of 60 mm$^2$. In addition, the pressure distribution can be influenced positively in this way.

The functional surface(s) can also have a size which is selected from a range with a lower limit of 20 mm$^2$ and an upper limit of 50 mm$^2$, or is selected from a range with a lower limit of 35 mm$^2$ and an upper limit of 40 mm$^2$.

It is also possible that a cross section of the base body in the direction of the height is designed to be at least almost u-shaped, whereby the incorporation of the power assist element into the hub is simplified.

To increase the functional safety of the shifting procedure it is an advantage if respectively at least one of the edges of the functional surface(s) is or are interrupted in the distal end section(s) in the direction of the height, as in this way the engagement of the complementary functional surface of the synchronizer hub can be performed more simply. In addition, in this way a more simple production of the power assist element is possible.

According to one embodiment variant the at least one additional functional surface of the central elevation is inclined in the direction of the lateral extension or according to a preferred embodiment variant the central elevation as viewed in the direction of the longitudinal extension has an at least almost trapezoidal cross section, with two mirror image inclined additional functional surfaces. In this way the radial movement of the power assist element is facilitated, as said inclined surface(s) can slide on one or two complementary surface(s) of the sliding sleeve groove. In particular, in this way also the overpressing—and thus unlocking—of the power assist element in the direction of the synchronizer hub by the sliding sleeve is simpler when the bearing torque is zero, whereby the necessary unlocking force can be reduced. On the other hand thus also an improved locking action of the power assist element can be achieved for the sliding sleeve.

In the region of the edges of the acute angles in the distal end section(s) an additional functional surface can be formed on the power assist element, which can be brought into active connection with the synchronizer ring. In addition, the synchronizer ring comprises at least one recess, in which the power assist element engages and in which it is at least partly mounted. Said recess in the synchronizer ring can be greater in circumferential direction than the longitudinal extension of the power assist element in this direction. In this case a locking surface for the synchronizer ring is provided, so that an additional locking toothing, as known from the prior art for this purpose, can be dispensed with, whereby the geometry of the synchronizer ring is simpler and the latter can be produced more economically.

An improved locking and unlocking effect with a reduced unlocking force is achieved, if the additional functional surface(s) are designed to be inclined relative to a cross-sectional plane defined by the longitudinal extension and the lateral extension, such that the length of the base body is greater in the direction of the central elevation.

To improve the support of the power assist element in the synchronizer hub it is possible that between at least one of the distal end sections and the central elevation, knob-like elevations are arranged, preferably on both sides, on the upper side of the base body.

Likewise to simplify the synchronizer ring it is possible that in the base body a recess is provided for the engagement of the synchronizer ring, whereby the synchronizer ring can comprise at least one projection projecting in axial direction, which engages in the recess of the power assist element. In this way the aforementioned locking toothing on the synchronizer ring can be dispensed with.

Preferably, in this case a wall of the base body delimiting the recess is at least partly beveled and in a further preferred embodiment variant the projection of the synchronizer ring is provided with at least one oblique, which has an inclination which is complementary to the inclined wall delimiting the recess in the base body. Also said measures are used in order to achieve an improved locking and unlocking effect with reduced unlocking force.

For a better understanding of the invention the latter is explained in more detail with reference to the following figures.

In a much simplified representation:

FIG. 3 shows a detail of the transmission synchronization device according to FIG. 1 in oblique view from the left;

FIG. 4 shows the detail of the transmission synchronization device according to FIG. 1 in oblique view from the right;

FIG. 9 shows a first embodiment variant of a power assist element in front view;

FIG. 10 shows a power assist element according to FIG. 7 in cross section along the line VIII-VIII in FIG. 7;

FIG. 11 shows the power assist element according to FIG. 7 in plan view;

FIG. 12 shows the power assist element according to FIG. 7 in oblique view;

FIG. 13 shows the power assist element according to FIG. 7 in side view;

Figure 1:
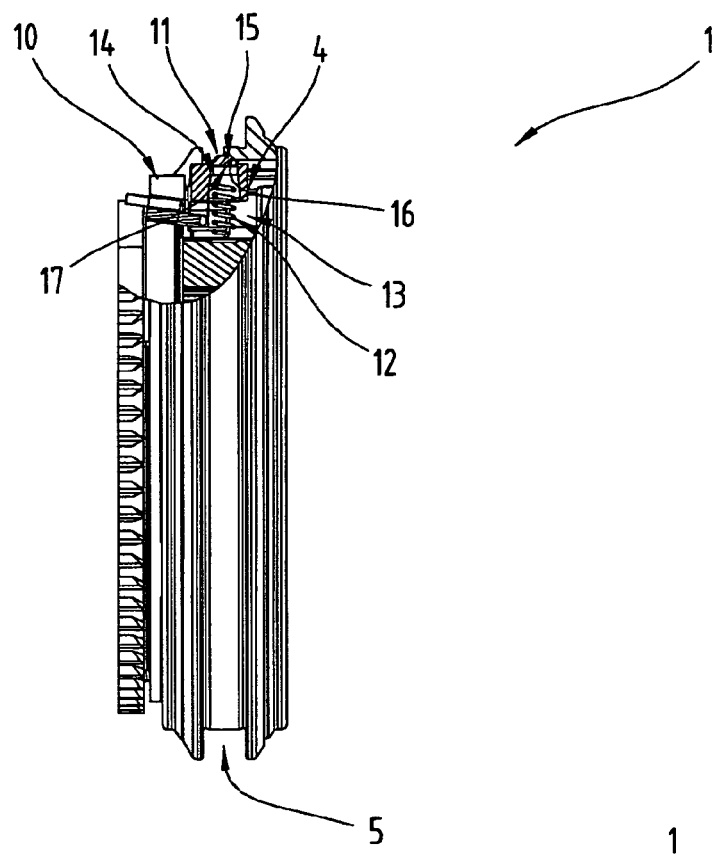
FIG. 1 shows an cutout of a transmission synchronization device in side view in a partial axial section.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Figure 2:
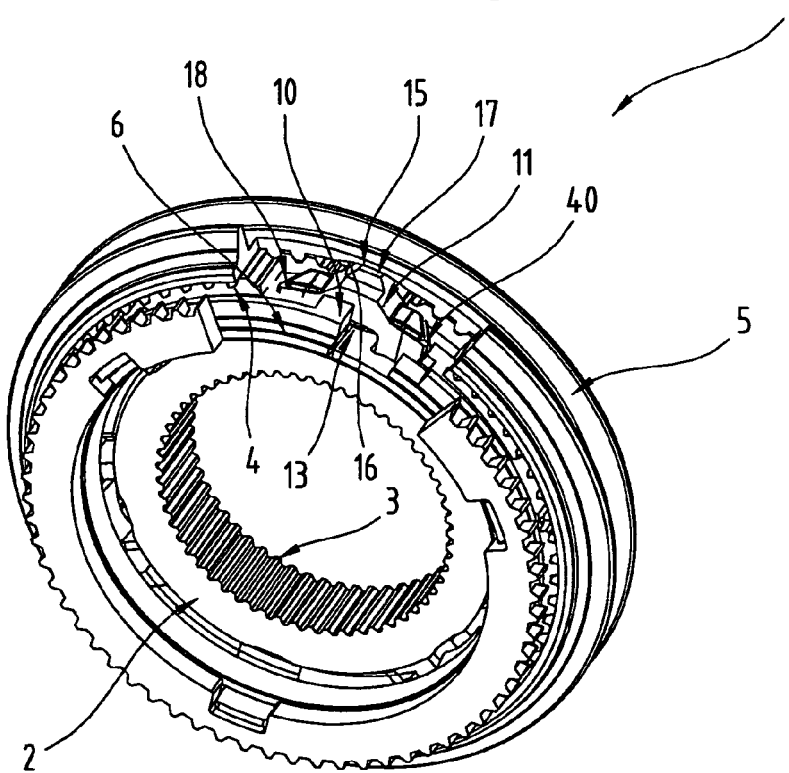
FIG. 2 shows the cutout according to FIG. 1 in oblique view, in partial cross section.
Figure 5:
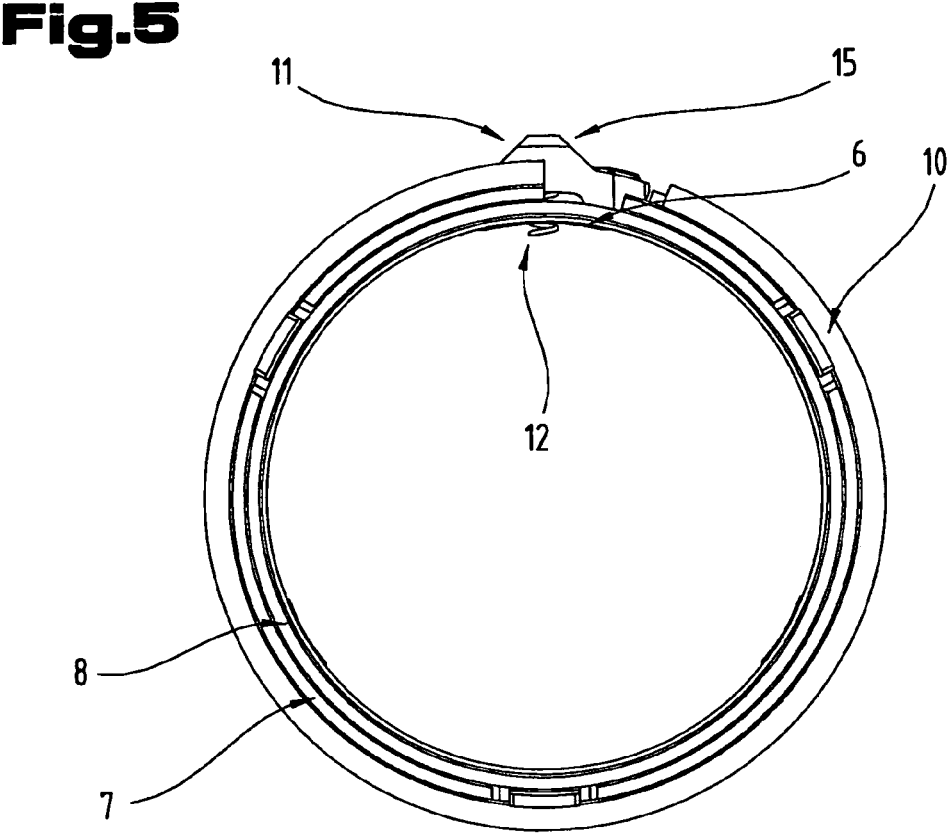
FIG. 5 shows the detail of the transmission synchronization device according to FIG. 1 in axial view.
Figure 6:
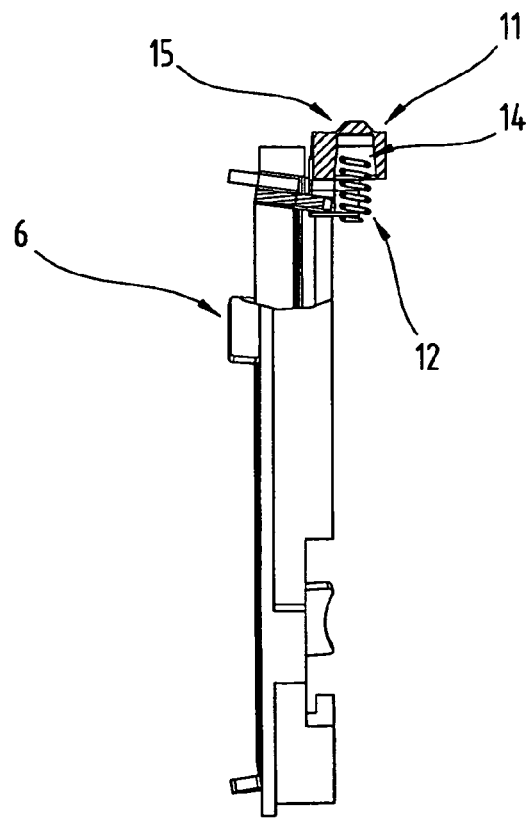
FIG. 6 shows the detail of the transmission synchronization device according to FIG. 1, in cross section along the line VI-VI in FIG. 5.

FIGS. 1 and 2 show a cutout of a transmission synchronization device 1, partly in cross section. As said transmission synchronization device 1 is similar to the Borg-Warner type, and the latter is described sufficiently in the relevant literature and would be known to a person skilled in the art, any further explanation of its principle functional is unnecessary.

The transmission synchronization device 1 is set up to couple in a non-rotatable manner or detach from the latter two adjacent idler gears, i.e. gear wheels (not shown) optionally to a shaft (not shown).

It is also possible within the scope of the invention to have a one-sided synchronization device, so that only one idler gear or the associated component parts, such as the friction packet, synchronizer ring, coupling body etc., can also only be provided singly.

The transmission synchronization device 1 comprises a synchronizer hub 2 with an internal connector toothing 3 for the non-rotatable connection of the synchronizer hub 2 to the shaft, and an outer sleeve toothing 4. The synchronizer hub 2 is arranged by conventional means axially non-displaceably on the shaft. On the synchronizer hub 2 a sliding sleeve 5 is mounted non-rotatably, but axially displaceably. The latter can be activated for example by a gearshift fork (not shown).

Furthermore, the transmission synchronization device 1 for each shifting direction comprises a friction packet 6—as best shown from FIGS. 3 to 6—consisting at least of an outer conical ring 7 and an inner conical ring 8, whereby the usual friction linings can be provided on the corresponding interacting surfaces on the conical rings 7, 8. The outer conical ring 7 comprises at least one driver element 9, which is connected in rotational direction positively to a coupling body (not shown). The coupling body is connected non-rotatably to the respective idler gear, i.e. the gear wheel. For example, the coupling body can sit in a non-rotatable manner on a cone of the idler gear, whereby corresponding free positions can be provided on the coupling body and complementary knobs can be provided on the cone of the idler gear.

Furthermore, it is possible that the gear wheel comprises a cone for example, with a spur toothing, and the coupling body has a spur toothing fitting the latter, whereby the non-rotatable arrangement of the coupling body on the gear wheel is made possible.

A synchronizer ring 10 is arranged radially externally and above the friction packet 6 on both sides of the synchronizer hub 2 respectively.

Between the synchronizer hub 2 and the sliding sleeve 5 on the one hand and in axial direction between the friction packets 6 on the other hand at least one power assist element 11 is arranged, such that the latter is pretensioned against the sliding sleeve 5 by a spring element 12, which in this embodiment variant is arranged in a recess 13, in particular a blind hole, of the synchronizer hub 2 on the one hand and a recess 14 the power assist element 11 on the other hand. In addition, the power assist element 11 comprises a central elevation 15 and the sliding sleeve 5 comprises on a bottom 16 facing the power assist element 11 a sliding sleeve groove 17 running in circumferential direction or a corresponding recess, in which the central elevation 15 engages. The spring tensioning can also be dispensed with if necessary, if the positioning of the power assist element 11 is performed by means of centrifugal forces occurring during the operation of the transmission synchronization device 1.

The spring element 12 can be designed as in the shown exemplary embodiment as a spiral spring, similarly with a slight modification it is possible to have a flat spring element, an annular spring or a pneumatic spring.

The friction moment in the friction packets 6 during the switching process is determined by the spring constant of the spring element 12.

Of course, it is possible within the scope of the invention to arrange several of these spring elements 12 in the transmission synchronization device 1 distributed around the circumference of the synchronizer hub 2, in particular symmetrically, in particular two or three per shifting direction or synchronization direction.

The power assist element 11 represents the core of the invention. By means of the latter a circumferential force bearing on the power assist element 11, which is created by the friction moment on the friction packet 6 during the synchronization process, is converted into an additional axial force and thus power amplification is achieved. An essential feature of this power assist element 11 is a wear-independent amplifying mechanism, i.e. a larger axial path resulting from wear in the friction packet 6 has no affect on the amplifying mechanism. There is thus no change in the position of the locking toothing/sliding sleeve, as is the case e.g. in the H-shaped pressure part known from the prior art, in which the contact point moves outwards and thus the synchronous position is moved increasingly further in circumferential direction. In the invention this is achieved by a fixed stop of the synchronizer ring 10 in a recess 18 in the synchronizer hub 2, which receives the power assist element 11.

As shown clearly in the figures, the power assist element 11 according to the invention does not extend over the entire width of the synchronizer hub 2 in axial direction. Preferably, the power assist element 11, i.e. its width in axial direction is measured, so that the power assist element 11 only extends into the latter by up to about 50% of the width of the synchronizer hub 2, in particular into the area of a central web of the synchronizer hub 2, as explained below in more detail.

As shown best from FIGS. 3 and 4 or 7 and 8, the synchronizer ring 10 has at least one recess 19, in this embodiment variant three recesses 19, in which the power assist element 11 is partially accommodated with little play in circumferential direction of the synchronizer ring 10. For example, this means that a distance between the synchronizer ring 10 and the amplifying element 11 in neutral position on both sides is selected from a range with a lower limit of 0.5 mm and an upper limit of 10 mm, or a range with a lower limit of 1 mm and an upper limit of 5 mm.

Figure 7:
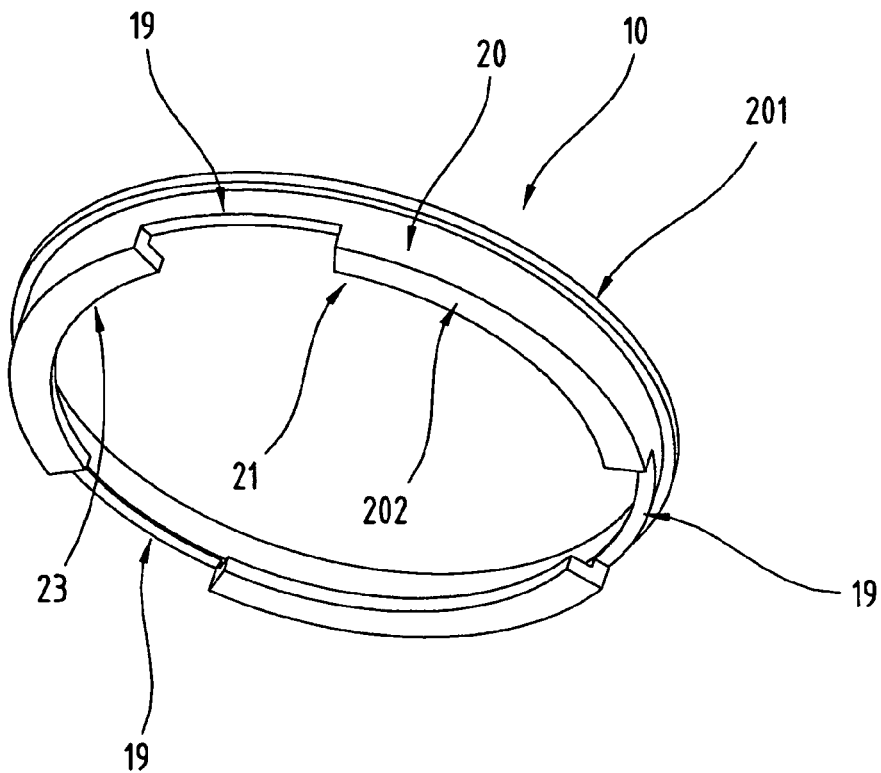
FIG. 7 shows a synchronizer ring in an oblique view.
Figure 8:
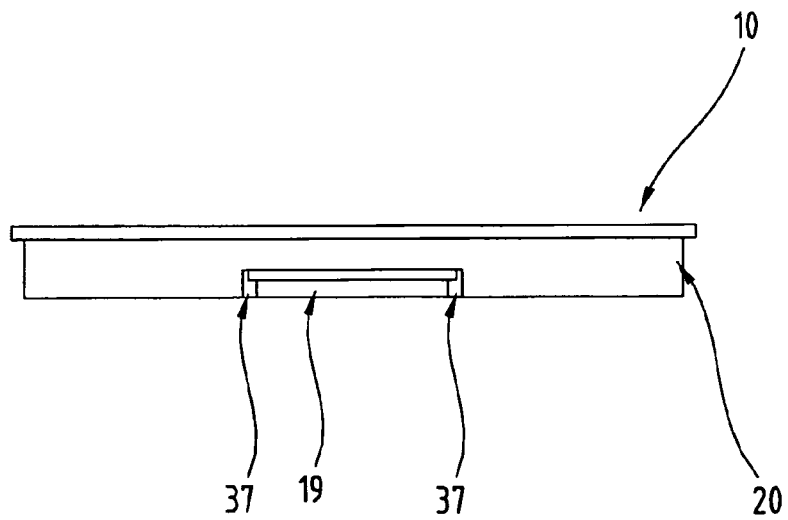
FIG. 8 shows the synchronizer ring according to FIG. 7 in plan view.

By means of the power assist element 11 according to the invention and the thus achieved assembly of the transmission synchronization device 1 the synchronizer ring 10 can be designed more simply with respect to its geometry, in that the latter in particular does not need to have any locking toothing, as shown in particular in FIGS. 7 and 8.

In this embodiment variant of the synchronizer ring 10 the latter is formed by a synchronizer ring body 20, which in addition to three recesses 19 for the partial mounting of the power amplifying elements 11 in the region of an inner circumference 21 has no additional recesses or projections, such as for example driver elements, and is thus not interrupted further with the exception of the recesses 19. On the side of the synchronizer ring body 20 opposite the recesses 19 in axial direction an annular web 201 is formed. The inner circumference 21 is formed by an additional annular web 202, which is only interrupted by the recesses 19. Owing to the simplicity of the geometry of the synchronizer ring 10 there are clear advantages for its production compared to synchronizer rings as known from the prior art. In particular, said synchronizer ring 10 is designed to be a sintered part.

The power assist element 11 of this first embodiment variant is shown more clearly in FIGS. 9 to 13, which show the power assist element 11 in different views.

As shown in FIG. 9, in this embodiment variant the power assist element 11, shown in front view, i.e. as viewed in the installation position in axial direction, has an almost u-shaped cross section. In the center, i.e. between the two arms of this profile cross section, the spring element 12 is arranged as described above (e.g. FIG. 3). The two edge areas next to the central elevation 15 are arranged opposite one another on the upper side of the power assist element 11, i.e. the side opposite the sliding sleeve 5 in the installed state, are designed to be inclined downwards, as shown in FIG. 9. Between these edge areas and the central elevation a, preferably obtuse angle is formed (as seen in front view according to FIG. 9), which in particular can have a value selected from a range with a lower limit of 20° and an upper limit of 140°, preferably from a range with a lower limit of 95° and an upper limit of 140°.

The power assist element 11 comprises a base body 22, which has a height 23, a longitudinal extension 24 and a lateral extension 25. The longitudinal extension 24 is in this case aligned in the installed state of the power assist element 11 in the circumferential direction of the synchronizer hub 2 (FIG. 2), the lateral extension 25 is aligned in the axial direction of the transmission synchronization device 1 (FIG. 2), wherein the longitudinal extension 24 is greater than the lateral extension 25, so that the power assist element 11 only extends over an area almost between 40% and 60%, in particular between 45% and 50%, of the width of the synchronizer hub 2 into the latter, i.e. compared to the pressure parts known from the prior art, which extend as a rule over almost the entire width of the synchronizer hub, and has a much smaller extension in axial direction of the transmission synchronization device 1. In opposite, distal end sections 26 in the direction of the longitudinal extension 24 respectively an oblique functional surface 27, the servo-synchronization oblique, is formed, such that the latter is perpendicular in relation to a cross sectional plane defined by the longitudinal extension 24 and the lateral extension 25. According to the invention said functional surfaces 27 are arranged in opposite direction, preferably in mirror image (also an asymmetrical design is possible within the scope of the invention with respect to the angle), inclined against the longitudinal extension 24, whereby the functional surfaces 27 are oriented respectively at an acute angle 28 to the greatest longitudinal extension 24 of the base body 22. In this case said greatest longitudinal extension 24 of the base body 22 in this embodiment variant is formed on the rear side of the power assist element 11, which bears partly in the recess 19 of the synchronizer ring 10 against the latter, as shown in FIG. 3. In other words, the functional surfaces 27 are inclined relative to the rotational plane of the synchronizer ring 10.

The acute angle 28, in which the functional surfaces 27 run relative to the greatest longitudinal extension 24 of the power assist element 11, in this embodiment variant of the power assist element 11 has an absolute value of 60°. In general, this angle can also be selected within the scope of the invention from the aforementioned ranges.

At least one of the functional surfaces 27 does not necessarily need to be perpendicular to the said cross sectional plane, but can also be arranged at an angle to the latter, i.e. oblique to the latter. The angle can be selected from a range with a lower limit of 1° and an upper limit of 75°, or from a range with a lower limit of 10° and an upper limit of 65°, and from a range with a lower limit of 15° and an upper limit of 55°.

The functional surfaces 27 have an area of about 38 mm². The latter can however in general be selected within the scope of the invention from one of the aforementioned ranges.

As shown in particular in FIG. 11 this variant of the power assist element 11 has approximately three sections, i.e. the central elevation 15 (FIG. 9) and the two edge areas or end areas 26 beginning from the transition from the central elevation (obtuse angle in FIG. 9) take up about a third of the longitudinal extension 24. This division can also be such that the two end areas 26 take up between 25% and 40%, in particular between 28% and 35% of the longitudinal extension 24, and the remainder is formed by the central elevation.

However, it is also possible that the end section 26 provided for the downshift function (right end section 26 in FIG. 11) is longer than the second end section 26 provided for the upshift function.

The power assist element 11 engages with the end face in the recess 19 of the synchronizer ring 10, which points in the direction of the synchronizer hub 2. By means of a free position 29 in the power assist element 11 in the region of the synchronizer ring 10 the power assist element 11 has two bearing surfaces 30, 31 on the synchronizer ring 10. This has the advantage in particular that with the provision of several power assist elements 11 over the circumference of the synchronizer hub 2 a better distribution of force is possible. For example with three power assist elements 11 there are six engagement or functional surfaces. In particular, the contact faces 30, 31 are at least almost at the same height or in the same plane, on which or in which pressure force is exerted on the tilted plane or ramp in the synchronizer hub 2, so that no additional torque is transmitted and thereby tilting can be prevented.

The synchronizer ring 10 can comprise a knob-like projection 32 (FIG. 4) projecting in axial direction over the annular web 201, which cooperates with the fixed stop of the synchronizer hub 2, as described above, and thus limits its mobility in circumferential direction. Said projection 32 does not necessarily need to be provided, as shown in the embodiment variant of the synchronizer ring 10 according to FIGS. 7 and 8.

The synchronizer hub 2 comprises on its outer circumference, i.e. in the region of the sleeve toothing 4 distributed around the circumference, several recesses 18, in which the cam-like projections 32 of the synchronizer rings 10 can engage, so that also the power assist element(s) 11 is or are arranged at least partly in said recesses 18.

The central elevation 15 of the power assist element 11 in this embodiment as viewed in cross section is designed to be trapezoidal with ramps 33 which slope obliquely in mirror image in the direction of the distal functional surfaces 24. It is also possible however for said cross sectional shape of the central elevation 15 to change within the scope of the invention, for example for the latter to be formed by a web-like elevation. The width in the longitudinal extension 24 of this central elevation 15 is dimensioned so that the arrangement of the power assist element 11 with the central elevation 15 is made possible in the recess 19 of the synchronizer hub 2. By means of the design of said central elevation 15 with a trapezoidal cross section the relative adjustability of the power assist element 11 to the synchronizer hub 2 is simplified, i.e. the arrangement of the power assist element 11 in the recess 19. The height of this central elevation 15 corresponds at least almost to the toothing height of the synchronizer hub 2.

Furthermore, the central elevation 15 has at least one additional functional surface 34, which is inclined in the direction of the lateral extension 25. Preferably, two such mirror-image inclined additional functional surfaces 34 are formed on the central elevation 15, so that the latter also comprises in the direction of the longitudinal extension 24 an at least almost trapezoidal cross section. Thus overall, the central elevation 15 in this embodiment variant is designed as a truncated pyramid. The functional surfaces 34 are in this case also designed to be trapezoidal, preferably as an equilateral trapezium. The power assist element 11 engages via said additional functional surface(s) 34 in the sliding sleeve groove 17, whereby said sliding sleeve groove 17 preferably has complementary inclined bearing surfaces, as shown in FIG. 1.

The absolute value of an angle 35, at which the additional functional surfaces 34 of the central elevation 15 are inclined, can preferably be selected from a range with a lower limit of 10° and an upper limit of 80°, in particular from a range with a lower limit of 20° and an upper limit of 60°. For the two additional functional surfaces 34 also different angles of inclination are possible relative to one another.

It is also preferable, if at least one of the edges of the acute angle 28 of the functional surfaces 27 in the distal end sections 26 is at least partly interrupted with the formation of additional functional surfaces 36, as shown from FIGS. 12 and 13. Said additional functional surfaces 36 are used for bearing against a wall surface 37 in the recess 19 of the synchronizer ring 10 (FIGS. 3 and 8). Said additional functional surfaces 36 are at least approximately triangular, for example in the form of a right-angled or isosceles triangle. By means of the arrangement of said additional functional surfaces 36 the functional surfaces 27 have a clearer trapezoidal shape (asymmetrical or any trapezoid) than without the latter, whereby the shorter of the parallel sides is formed in the region of the additional functional surfaces 36. It is also possible that the functional surfaces 27 have the form of an irregular quadrilateral.

It should be noted at this point that the description of the shape of the functional surfaces 27, 34 and 36 relates to a plan view of the latter.

The ratio of the length of the lower base side to the height of the respective surface can be selected for the functional surfaces 27 from a range with a lower limit of 1:3 and an upper limit of 1:6 and can be selected for the functional surfaces 34 from a range with a lower limit of 1:5 and an upper limit of 1:20, with respect to the dimension in mm. In this case the base side is the longest side of the quadrilateral. The height is defined at a right angle to the base side.

The height of the triangular functional surface 36 can be selected from a range with a lower limit of 2 mm and an upper limit of 10 mm.

All of the details regarding the dimensions of the functional surfaces 27, 34, 36 relate to the respective surface itself, i.e. are independent of the respective angle of inclination.

On both sides next to the central elevation 15 the base body 22 in the direction of the central elevation 15 comprises projecting knob-like projections, which, as viewed in plan view (FIG. 11), have an almost approximately trapezoidal cross section. Said projections are designed to be inclined in the direction of the distal end sections of the base body 11 (FIG. 9), wherein the sections of the projections which are closer to the central elevation 15 have a smaller inclination than the sections which are arranged in the region of the distal end sections 26. The transition between the inclinations is thus almost at the height of the beginning of the free position 29 along the rear side of the power assist element 11.

Generally, it should be noted that several or all of the edges of the power assist element can be interrupted or in particular can be provided with rounded parts.

In one particular embodiment variant said additional functional surfaces 36 are designed to be inclined in the direction of the longitudinal extension 24, wherein the absolute value of an angle 38 can be selected from a range with a lower limit of 20° and an upper limit of 90° or from a range with a lower limit of 50° and an upper limit of 85°. Also said additional functional surfaces 36 are designed in particular to be inclined in mirror image, whereby the inclination is such that a length of the base body 22 is greater in the direction of the central elevation 15.

Preferably, also the wall surfaces 37 of the recess 19 of the synchronizer ring 10 which can also be moved into active connection with said additional functional surfaces 36 have an inclination complementary to the inclination of the additional functional surface 36, as shown in FIG. 3 and FIG. 8.

The additional functional surfaces 36 and/or the additional functional surfaces 34 and/or the surfaces of the synchronizer ring 10 and the sliding sleeve 5 which can be moved against the latter can also be designed differently, for example with no inclination or a multiple graduated inclination.

Although the flat bearing of the functional surfaces 27 onto the corresponding ramps of the synchronizer hub 2 is the preferred design, it is also possible within the scope of the invention to have a point-touching bearing or linear bearing of the functional surfaces 27 on the ramps. In addition, either the ramps in the synchronizer hub 2 or the functional surfaces 27 can be designed to be curved.

Said functional surfaces 27 do not necessarily have to be designed to be quadratic or rectangular, in particular in the design of the obliquely downwards directed additional functional surfaces 36.

A forwards pointing end face 39 of the power assist element 11, i.e. the end face 39 pointing in the direction of the cut edge formed in an imaginary extension of the functional surfaces 27 by the latter, is designed to be rounded. In a modification of this it is also possible that said end face 39 is designed essentially to be planar and if necessary transitional areas to the adjoining surfaces are provided with rounded sections.

By means of this projecting end face 39 it is possible to arrange the central elevation 15 with improved stability of the power assist element 11 to be a-centric, as shown in particular in FIGS. 11 and 13.

The synchronizer hub 2 comprises below the sleeve toothing 4 and above the connector toothing 3 in the recess 18 to the functional surfaces 25 at least almost complementary, i.e. with a supplementary angle to the acute angle 30 of the distal end sections of the power assist element 11, obliquely running functional surfaces 40 (FIG. 2), i.e. the already mentioned ramps, which if necessary can be designed to be rounded, whereby the sleeve toothing 4 can extend over said oblique functional surfaces 40 in circumferential direction. In addition, the synchronizer hub 2 can have an annular web extending in circumferential direction, on which said functional surfaces 40 are formed. The distance in circumferential direction between the two functional surfaces 40 is also dimensioned so that the power assist element 11 can be arranged with play between functional surfaces 27 and functional surfaces 40, thus its axial displacement is possible in the recess, or the power assist element 11 in a neutral position bears against said functional surfaces 40 and during the synchronization slides on the latter. By means of the axial displacement of the power assist element 11, caused by the displacement of the sliding sleeve 5 and the coupling with the inner conical ring 8, by means of the oblique functional surfaces 27 a servo-power is generated in addition to the axial force due to the shifting force via the shift fork, which engages in the siding sleeve 5, and thus power amplification is achieved. Said power amplification is in this case independent of the wear in the friction packets 6, as already explained above.

In the transmission synchronization device 1 according to the invention the coupling of the inner conical ring 8, i.e. the friction ring, is not to the synchronizer ring 10 but to the power assist element 11, so that the synchronizer ring 10 can be designed to have a simpler structure. The synchronizer ring 10 unlike the synchronizer ring of the synchronization device, e.g. according to DE 694 06 413 T2 or the Borg-Warner synchronization can be designed without downwards projecting coupling elements, or extensions in axial direction or radial direction are formed as stop surfaces for spring elements. Its end face pointing to the synchronizer hub 2 can be designed to be at least substantially planar.

Initiated by the axial displacement of the sliding sleeve 5, for example triggered by the shifting procedure of a driver, in the friction packet 6 a friction torque is generated by the conical rings 7, 8 by the displacement of the power assist element 11 in axial direction by sliding the functional surface 27 along the ramp/functional surface 40 of the synchronizer hub 2. Said friction moment has an effect via the inner conical ring 8 on the power assist element 11, so that the latter is displaced axially and thus the amplifying servo power is generated. The synchronizer ring 10 is displaced axially by the power assist element 11 also in shifting direction to the desired gear wheel (idler gear) and rotated, until the latter reaches its synchronization position and the sliding sleeve 5 by overpressing the spring force of the spring element 11 can produce the active connection with the desired gear wheel. At the same time by means of the projections 9 of the outer conical ring 7 the coupling body belonging to the gear wheel and thus the gear wheel rotates up to the coupling in the coupling side into the synchronous position.

The power assist element 11 is moved in the transmission synchronization device 1 according to the invention in axial and radial direction and is mounted rotationally. The power assist element 11 however is not mounted to be tiltable.

Figure 14:
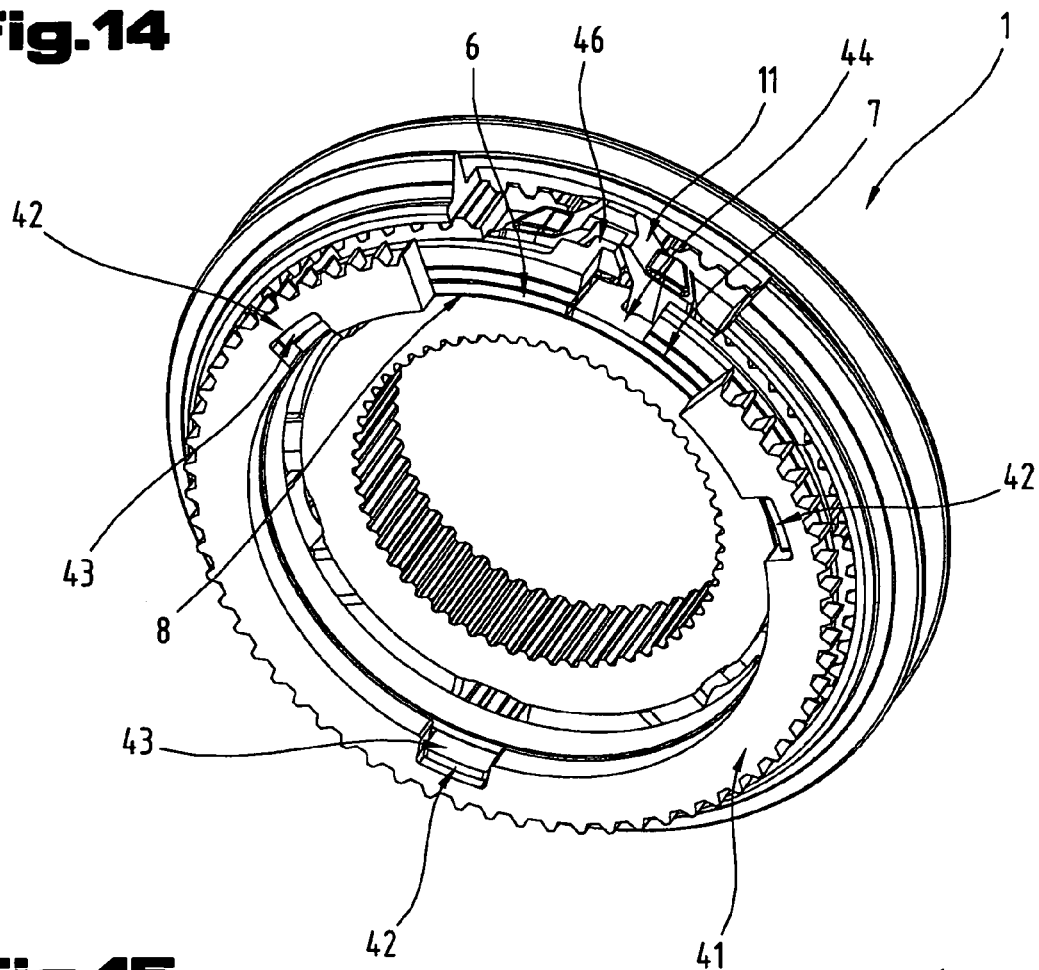
FIG. 14 shows a cutout of an embodiment variant of a transmission synchronization device in oblique view with a partial axial section.
Figure 15:
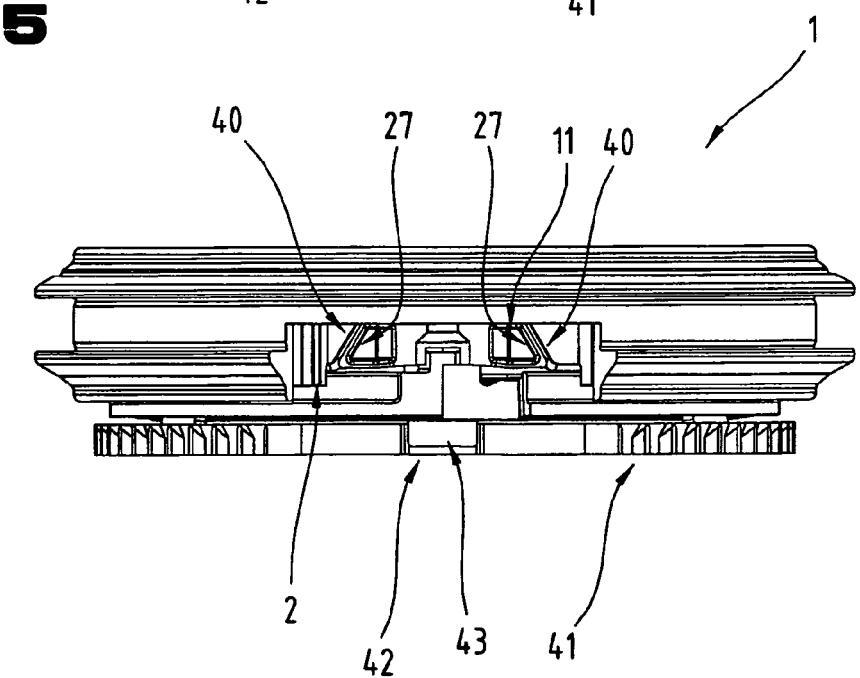
FIG. 15 shows the transmission synchronization device according to FIG. 12 in plan view.
Figure 16:
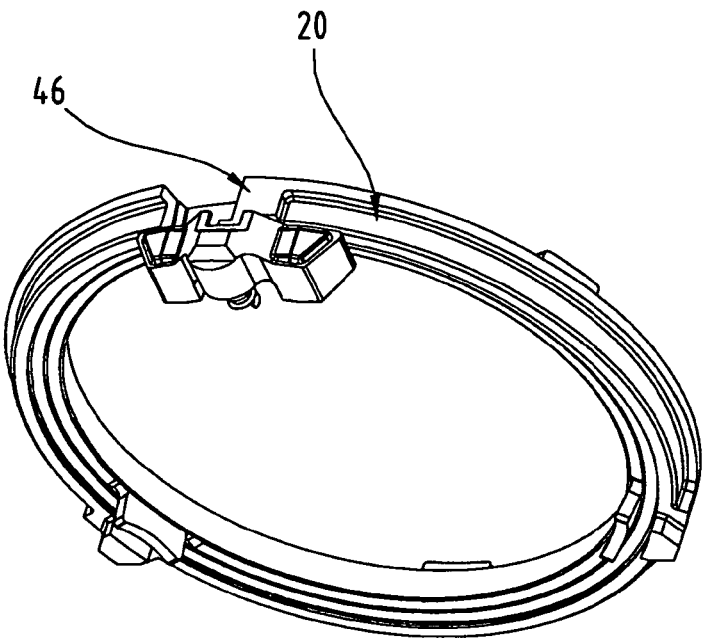
FIG. 16 shows a detail of the transmission synchronization device according to FIG. 12 in oblique view from the left.
Figure 17:
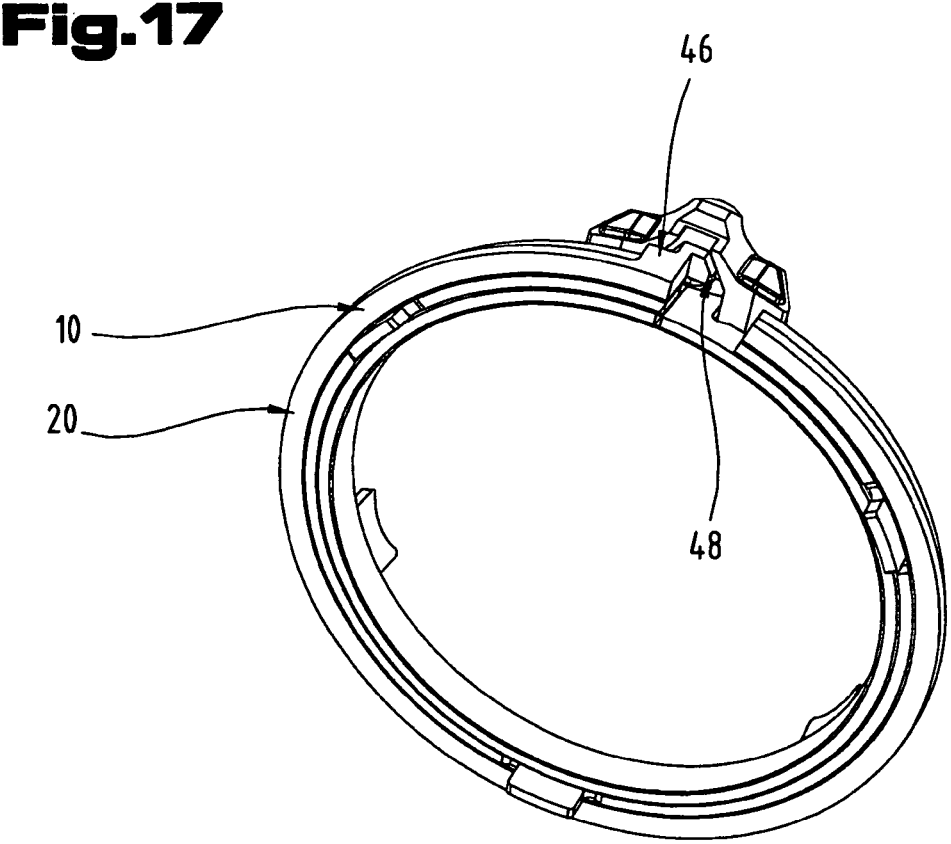
FIG. 17 shows the detail of the transmission synchronization device according to FIG. 12 in oblique view from the right.
Figure 18:
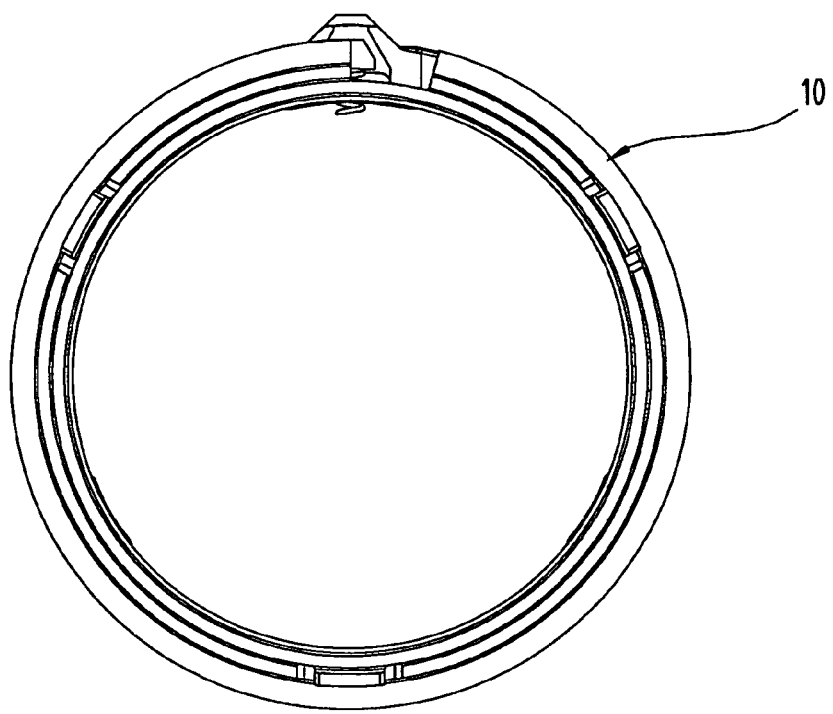
FIG. 18 shows the detail of the transmission synchronization device according to FIG. 12 in axial view.
Figure 19:
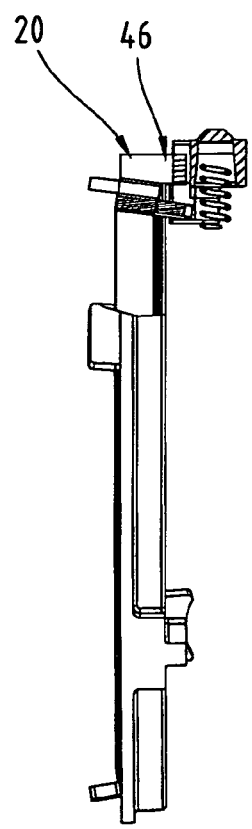
FIG. 19 shows the detail of the transmission synchronization device according to FIG. 12, in cross section along the line XVII-XVII in FIG. 16.

FIGS. 14 and 15 show a detail of an embodiment variant of the gear synchronization device 1. In this case the same parts are provided with the same reference numbers, so that reference is made here to the explanations relating to FIGS. 1 to 13.

It should also be noted that in the Figures an incomplete gear synchronization device 1 of a multiple gear changing transmission is shown for a better overview, and only elements essential to the invention are shown in order to understand its mode of functioning. Reference is made to the relevant literature, e.g. the Borg-Warner type. In general, the power amplification can also be used for one-side synchronizations.

As in the aforementioned embodiment variant here too a coupling body 41 comprises recesses 42 for the engagement of driver elements 43 of the inner conical ring 7 of the friction packet 6.

The power assist element 11, which is best shown in FIGS. 21 to 24, is designed in turn to have a U-shaped cross section, in order to enable, as also in the aforementioned variant, the engagement of a driver element 44 of the inner conical ring 8 of the friction packet 6.

Furthermore, the power assist element 11 comprises the two mirror-image inclined functional surfaces 27, which can be placed against the complementary inclined ramps, i.e. functional surfaces 40 of the synchronizer hub 2 for power amplification, and the functional surfaces 34 on the central elevation 15.

As shown in particular in FIGS. 21 to 24, the power assist element 11 is designed without the two functional surfaces 36 (FIG. 9) in the region of the acute angle 28 in the distal end sections 26, but said edges are provided simply with a rounded part.

With respect to the geometric design of the functional surfaces 27 and 34 reference is made to the above explanations on the power assist element 11 of the first embodiment variant, whereby the distal functional surfaces 27 in this case can also be designed to be at least approximately quadratic or at least approximately rectangular.

The main difference from the power assist element 11 according to FIGS. 9 to 13 is that on the rear side of the power assist element 11 between the free position 29 and the central elevation 15 or projecting into the central elevation 15 a recess 45 open to the rear is provided in the base body, which is used for mounting driver elements 46 of the synchronizer ring 10, which project in axial direction from the synchronizer ring body 20, shown best in FIGS. 16 to 19. In other words the synchronizer ring 10 in this variant is "suspended" by the driver elements 46 in the power assist element 11, whereas in the first variant the power assist element 11 is "suspended" in the recess 19 of the synchronizer ring 10. By means of said recess 45 a fixed connection is made possible between the power assist element 11 and the synchronizer ring 10. In the embodiment described above this connection of the power assist element 11 to the synchronizer ring 10 is made possible by the recesses 19 in the synchronizer ring 10.

Figure 20:
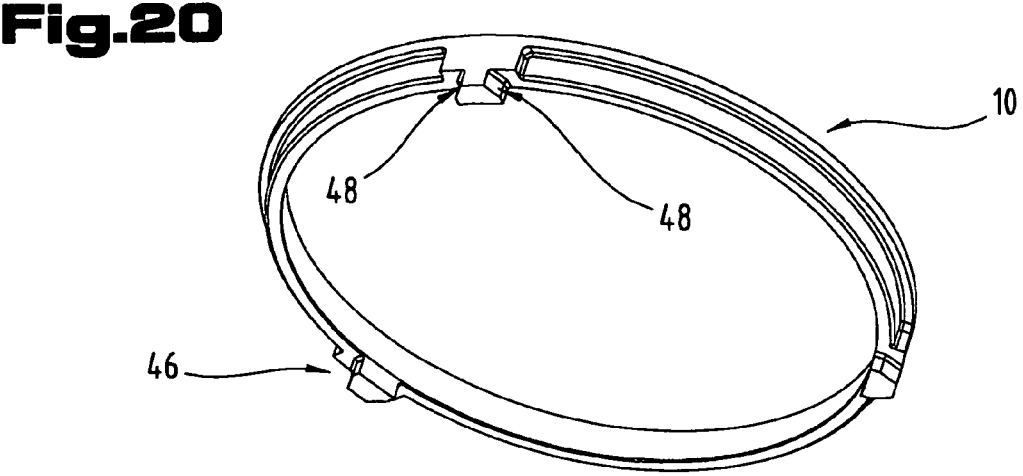
FIG. 20 shows an embodiment variant of a synchronizer ring.
Figure 21:
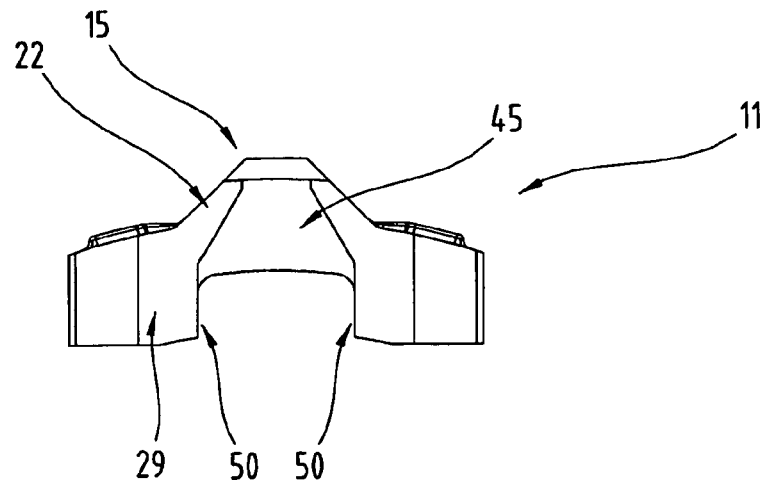
FIG. 21 shows a further embodiment variant of a power assist element in front view.
Figure 22:
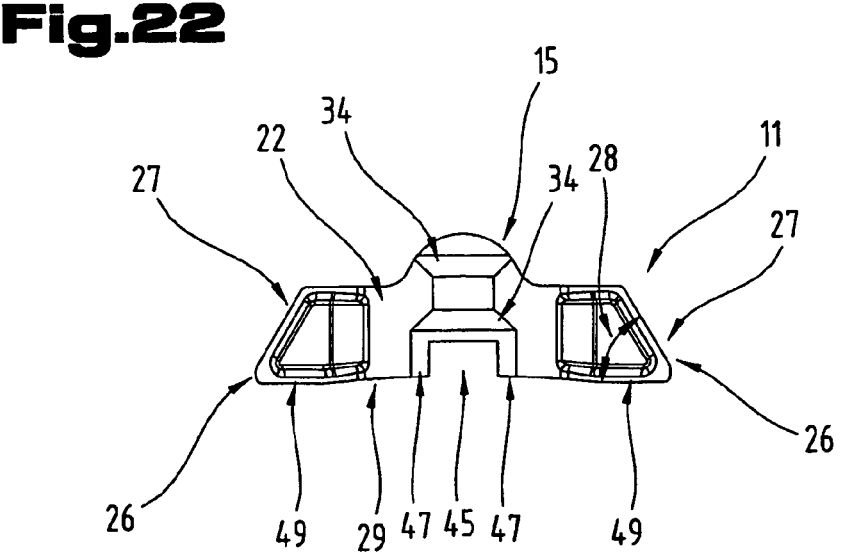
FIG. 22 shows the power assist element according to FIG. 18 in plan view.
Figure 23:
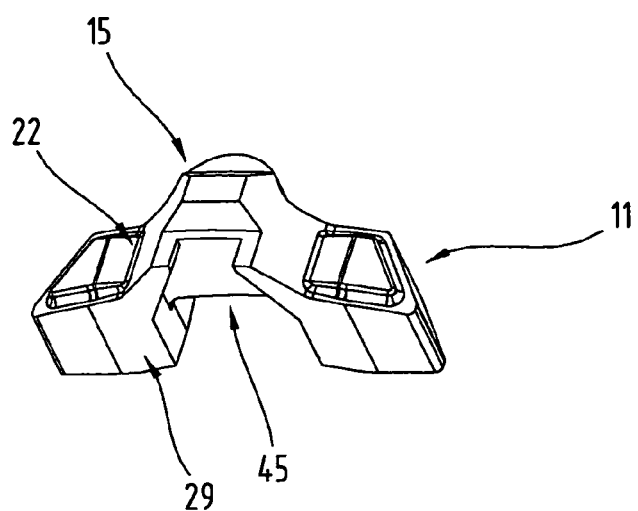
FIG. 23 shows the power assist element according to FIG. 18 in oblique view.
Figure 24:
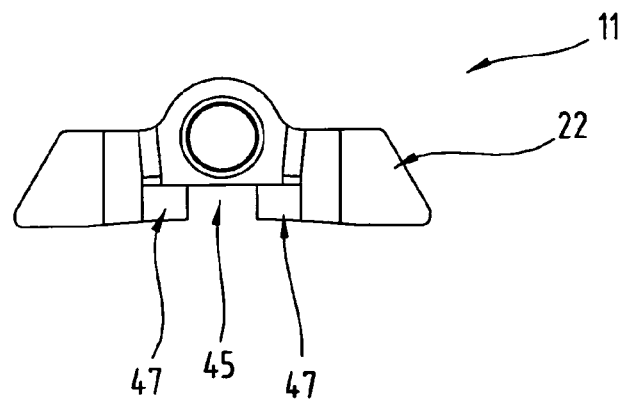
FIG. 24 shows the power assist element according to FIG. 18 in a view from below.

The recess 45 has at least two opposite, at least partly upwardly oblique and opposite running side walls 47. In the variant of the power assist element 11 according to FIGS. 21 to 24 also the rear side is designed to run obliquely upwards, but with an inclination in the direction of the central elevation 15. Likewise the driver element 46 on the synchronizer ring 10 has beveled side surfaces 48, as shown in particular in FIG. 20, which only shows the synchronizer ring 10, the inclination of which is designed to be in particular complementary to the inclination of the oblique side walls, so that said surfaces can slide on one another more effectively.

To avoid repetition, reference is made to the explanations on the first variant for further details on the power assist element 11 of this second variant.

In addition to the functional surfaces 27 the amplification elements 11 according to the embodiment variants have additional functional surfaces 49, 50 (FIG. 9, 11 or FIG. 21, 22), namely the application surfaces for the synchronizer ring 10 (functional surfaces 49) on the two distal end sections 26 in connection with the functional surfaces 27, which form the acute angle 28 with the latter, or only one of the latter, and because of the spring element 12 on the inner surfaces of the end sections 26, which are opposite said spring element 12. Between the functional surfaces 49 also the above-mentioned free position 29 is formed in the power assist element 11 for the synchronizer ring 10. The functional surfaces 50 are used during the resetting of the power assist element 11.

Figure 25:
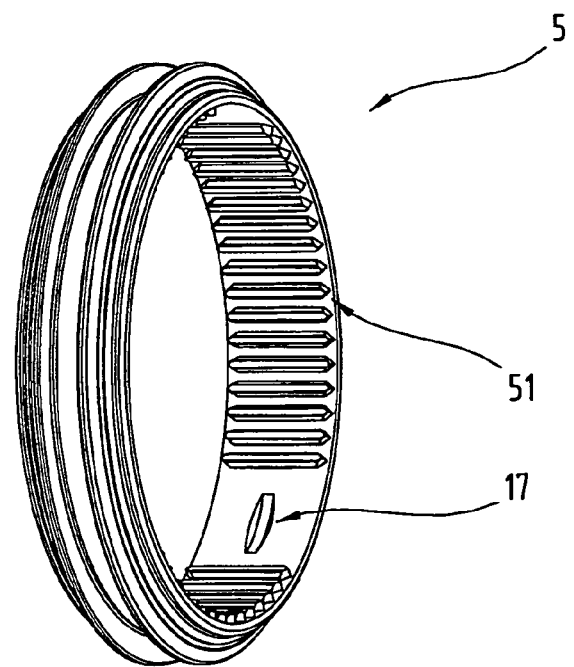
FIG. 25 shows a sliding sleeve in oblique view.

Lastly, FIG. 25 shows the sliding sleeve 5 alone. As shown clearly, between, the sections, in which a sliding sleeve toothing 51 is formed, a sliding sleeve groove 17 is provided for the engagement of the central elevation 15 of the power assist element 11. The latter thus extends only over part of the inner surface of the sliding sleeve 5. For each power assist element there is a sliding sleeve groove 17. Theoretically said sliding sleeve groove 17 can extend over the entire inner circumference of the sliding sleeve 5, however, this would have the disadvantage that in this way the sliding sleeve toothing 51 is interrupted.

By means of the sliding sleeve groove 17 on the one hand an alignment of the power assist element 11 is achieved. On the other hand in this way the displacement of the sliding sleeve 5 is locked as long as there is a torque on the power assist element 11. If said torque has dropped to zero the power assist element 11 can be pushed downwards in the direction of the synchronizer hub 2, so that the sliding sleeve is unlocked. By means of the downwards movement of the power assist element 11 its functional surfaces 27 slide on the functional surfaces of the synchronizer ring 10, i.e. the wall surfaces 37, whereby the synchronizer ring 10 is rotated. As the locking is performed by the power assist element 11, no locking toothing is necessary on the synchronizer ring 10. The resetting is performed when the produced frictional moment becomes smaller again.

By way of the embodiment of the oblique functional surfaces 40 on the web below the sleeve toothing 4 of the synchronizer hub 2 the power assist element 11 can be installed more deeply into the synchronizer hub 2, whereby the structural height of the transmission synchronization device can be reduced.

In particular, the power assist element 11 and/or the synchronizer ring 10 are preferably made from a sintered material, whereby also other components of the transmission synchronization device 1 or the latter can be made completely from a sintered material.

In addition to the in particular symmetrical embodiment variants of the power assist element 11 described above and shown in the Figs. it is also possible to design the latter with only one functional surface 27 and/or only one functional surface 34 and/or only one functional surface 36, if power amplification is necessary or desired only in one direction. The above embodiments can be transferred accordingly. In this case for example also the synchronizer hub 2 can have only one of the functional surfaces 40 per recess 18. Instead of the second acute-angled functional surface 27 for example a surface arranged at right angles to the longitudinal extension 24 of the base body 22 (observed in plan view) can be provided.

Various different non-restrictive embodiments of power assist elements 11 are shown in FIGS. 26 to 29. Said variants at the same time show the basic principles of the invention more effectively. On the one hand, the wedge function is for forming the servo-synchronization oblique, i.e. the functional surface 27 in the distal end section 26, for the downshift function, whereby it should be noted that, as in the other embodiment variants of the power assist element 11 also a second oblique, i.e. a second functional surface 27 can be formed in the second distal end section for the upshifting function.

The functional surface 27 is oriented, as in the other variants, towards the idler gear.

Also said power assist elements 11 extend up to a maximum of half of the synchronizer hub 2 into the latter (not shown), whereby the above explanations relating to this also apply here. With respect to the geometric dimensions in plan view, in these variants the central elevation 15 with the functional surface 34 for engagement into the sliding sleeve groove 17 of the sliding sleeve 5 (FIG. 25) takes up between about 40% and 50% of the longitudinal extension 24, the remainder is formed by the oblique distal end section 26.

As already explained above, the second distal end section 26 can be designed to be straight, i.e. at right angles to the longitudinal extension 24, wherein also other forms are possible, e.g. with a rounded part or a small oblique or with beveled or broken edges, etc.

Figure 26:
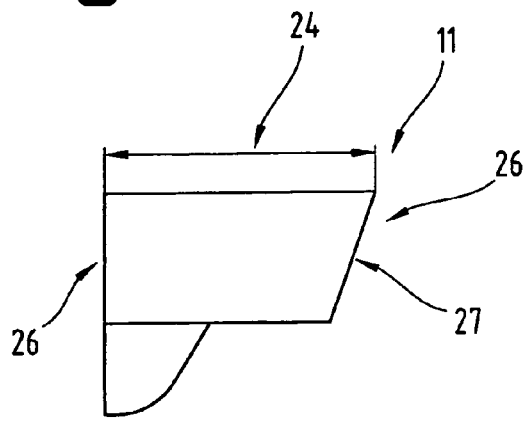
FIG. 26 shows a further embodiment variant of a power assist element with only one servo-synchronization oblique in a view from below.
Figure 27:
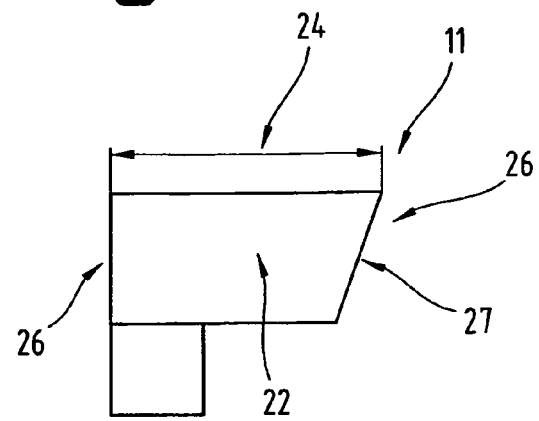
FIG. 27 shows a variant of the power assist element according to FIG. 26 in a view from below.
Figure 28:
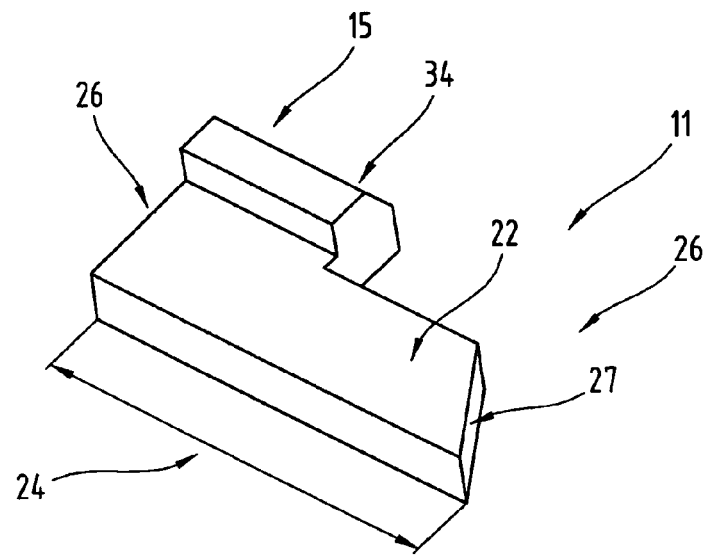
FIG. 28 shows a further embodiment variant of the power assist element according to FIG. 26 in an oblique view.

It is also shown that the central elevation 15 of the power assist element 11 need not necessarily extend over at least approximately the width of the power assist element in axial direction of the transmission synchronization device 1 (FIG. 1), but e.g. is arranged only in the front section, which is provided in the above explanations with the rounded part, and afterwards passes with graduation into the rest of the base body 22 of the power assist element 11, although rounded parts are also possible here, as shown in FIG. 26.

Figure 29:
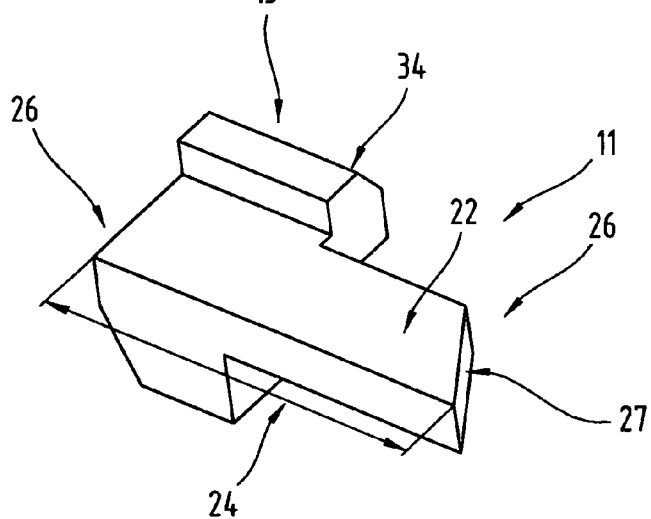
FIG. 29 shows another embodiment variant of the power assist element according to FIG. 26 in an oblique view.

Furthermore, in the area of the central elevation 15 also on the bottom of the base body 22 and opposite the central elevation 15 a projection can be formed, as shown in FIG. 29, e.g. in order to enable a better integration of the power assist element 11 into the synchronizer ring 10 or the synchronizer hub 2 (both not shown), wherein in the second distal end section said projection can be provided with an oblique surface (shown in FIG. 29), which is inclined in the direction of the longitudinal extension 24, so that also said end section 26 is designed to be at least almost wedge-shaped, but with a different orientation to the functional surface 27.

The power assist element 11 of these variants can have at least almost half the longitudinal extension 24 of the power assist element 11 in the above embodiments each with one functional surface 27 per end section 26.

In all of the embodiment variants of the invention the power assist element 11 has no negatively formed servo-functional obliques (functional surfaces 27), as is the case in the prior art, such as e.g. in EP 1 900 956 A, but the latter point outwards positively. In addition, the functional surface(s) 34 of the central elevation 15 is or are preferably angled relative to the functional surfaces 27 in the distal end sections 26. In particular, an absolute value of the angle between said functional surfaces—as viewed in plan view—is selected from a range with a lower limit of 3° and an upper limit of 89°.

It is also possible in all of the embodiment variants for the power assist element 11 to have a slight surface curvature, the radius of which can correspond at least almost to the radius of curvature of the synchronizer ring 10, in order to achieve better integration.

The exemplary embodiments show possible embodiment variants of the power assist element 11, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Finally, as a point of formality, it should be noted that for a better understanding of the structure of the power assist element 11 the latter and its components have not been represented true to scale in part and/or have been enlarged and/or reduced in size.

LIST OF REFERENCE NUMERALS

1 transmission synchronization device
2 synchronizer hub
3 connector toothing
4 sleeve toothing
5 sliding sleeve
6 friction packet
7 conical ring 8 conical ring
9 driver element
10 synchronizer ring
11 power assist element
12 spring element
13 recess
14 recess
15 central elevation
16 bottom
17 sliding sleeve groove
18 recess
19 recess
20 synchronizer ring body
201 annular web
202 annular web
21 circumference
22 base body
23 height
24 longitudinal extension
25 lateral extension
26 end section
27 functional surface
28 angle
29 free position
30 bearing face
31 bearing face
32 projection
33 ramp
34 functional surface
35 angle
36 functional surface
37 wall surface
48 angle
39 end face
40 functional surface
41 coupling body
42 recess
43 driver element
44 driver element
45 recess
46 driver element
47 side wall
48 side surface
49 functional surface
50 functional surface
51 sliding sleeve toothing

The invention claimed is:

1. Transmission synchronization device with at least one synchronizer hub which can be arranged on a shaft, on which synchronizer hub at least one synchronizer ring is arranged opposite in axial direction, at least one gear wheel arrangeable on the shaft, at least one friction packet, which is arranged below the synchronizer ring and is in operating connection therewith, and with at least one sliding sleeve arranged above the synchronizer hub, which sliding sleeve has an internal connector toothing for non-rotatable connection with the shaft and an outer sleeve toothing, whereby between the gear wheel and the synchronizer ring a coupling body is arranged and whereby the synchronizer hub comprises at least one recess in which at least one spring-loaded power assist element is arranged, which comprises a base body, a height and—as viewed in plan view—a longitudinal extension and a lateral extension, whereby the longitudinal extension in circumferential direction of the synchronizer hub and the lateral extension are formed or arranged in the direction of the width of the synchronizer hub in axial direction, and which in the direction of the longitudinal extension comprises two opposite distal end sections, whereby in at least one end section, a functional surface is formed, which cooperates with the synchronizer hub, and which in the distal end section(s) is or are inclined at an acute angle to the greatest longitudinal extension of the base body, whereby on the base body between the two distal end sections a central elevation for engagement in a sliding sleeve groove is formed on a bottom of the sliding sleeve, whereby the central elevation comprises at least one additional functional surface, which can be brought into operating connection with the sliding sleeve, wherein the at least one additional functional surface of the central elevation is inclined in the direction of the lateral extension and the sliding sleeve groove comprises complementary inclined bearing surfaces against which the at least one additional functional surface bears, wherein also the synchronizer hub underneath the sleeve toothing and above the connector toothing in the recess to the functional surfaces has oblique function surfaces running at least approximately at a supplementary angle to the acute angle of the distal end sections of the power assist element, for which reason the synchronizer hub comprises an annular web extending in circumferential direction, on which said functional surfaces are formed, and wherein a spacing in circumferential direction between the two functional surfaces is such that the power assist element is arranged with play between the functional surfaces of the distal end sections and the functional surfaces in the recess, i.e. axial displacement of the power assist element is possible in the recess or in neutral position the power assist element bears against the functional surfaces and during the synchronization slides thereon via axial displacement.

2. Transmission synchronization device according to claim 1, wherein the acute angle of the functional surfaces of the power assist element relative to the greatest longitudinal extension has an absolute value which is selected from a range with a lower limit of 3° an upper limit of 89°.

3. Transmission synchronization device according to claim 1, wherein the functional surface(s) of the power assist element has/have a size, which is selected from a range with a lower limit of 5 mm² and an upper limit of 60 mm².

4. Transmission synchronization device according to claim 1, wherein a cross section of the base body of the power assist element is designed to be at least approximately u-shaped in the direction of the height.

5. Transmission synchronization device according to claim 1, wherein at least one of the edges of the functional surface(s) of the power assist element is or are interrupted in the distal end section(s) in the direction of the height.

6. Transmission synchronization device according to claim 1, wherein the central elevation of the power assist element as viewed in the direction of the longitudinal extension has an at least approximately trapezoidal cross section, with two mirror-image inclined additional functional surfaces.

7. Transmission synchronization device according to claim 1, wherein edges of the acute angle(s) of the functional surface(s) of the power assist element is or are interrupted at least partly with the formation of additional functional surfaces.

8. Transmission synchronization device according to claim 1, wherein the additional functional surface(s) of the power assist element are designed to be inclined relative to a cross sectional plane defined by the longitudinal extension and the lateral extension and wherein the length of the base body is greater in the direction of the central elevation.

9. Transmission synchronization device according to claim 1, wherein between at least one of the distal end sections and the central elevation of the power assist element a knob-like elevation is arranged on the upper side of the base body.

10. Transmission synchronization device according to claim 1, wherein in the base body of the power assist element a recess is arranged for the engagement of a synchronizer ring.

11. Transmission synchronization device according to claim 9, wherein a side wall of the base body delimiting the recess is at least partly beveled.

12. Transmission synchronization device according to claim 1, wherein the synchronizer ring comprises at least one recess, in which the at least one power assist element engages.

13. Transmission synchronization device according to claim 1, wherein the synchronizer ring comprises at least one driver element projecting in axial direction, which engages in the recess of the power assist element.

14. Transmission synchronization device according to claim 12, wherein the driver element of the synchronizer ring is provided with at least one oblique side surface, which has an inclination complementary to the beveled wall delimiting the recess in the base body of the power assist element.

15. Transmission synchronization device according to claim 1, wherein the synchronizer ring comprises a locking-toothing-free synchronizer ring body, which comprises at least one recess for the partial mounting of a power assist element, and wherein an inner circumference is only interrupted by the at least one recess, or wherein the locking-toothing-free synchronizer ring body comprises at least one driver element projecting over the latter in axial direction and is free of radially downwards pointing projections, wherein side walls of the recess or the at least one driver element have at least partly beveled functional surfaces for bearing on the power assist element.

16. Transmission synchronization device according to claim 1, wherein the transmission synchronization has a single cone design.

17. Transmission synchronization device according to claim 1, wherein the transmission synchronization has a double cone design.

* * * * *

UNITED STATES PATENT AND TRADEMARK OFFICE
CERTIFICATE OF CORRECTION

PATENT NO. : 8,528,435 B2  Page 1 of 1
APPLICATION NO. : 12/737672
DATED : September 10, 2013
INVENTOR(S) : Hackl et al.

It is certified that error appears in the above-identified patent and that said Letters Patent is hereby corrected as shown below:

In the Claims

In Column 18, line 36 (line 5 of Claim 2) after "3°" please insert the word: --and--.

Signed and Sealed this
Twenty-fourth Day of December, 2013

Margaret A. Focarino
*Commissioner for Patents of the United States Patent and Trademark Office*

UNITED STATES PATENT AND TRADEMARK OFFICE
CERTIFICATE OF CORRECTION

PATENT NO.       : 8,528,435 B2                                      Page 1 of 1
APPLICATION NO.  : 12/737672
DATED            : September 10, 2013
INVENTOR(S)      : Hackl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 298 days.

Signed and Sealed this
Fifteenth Day of September, 2015

Michelle K. Lee
*Director of the United States Patent and Trademark Office*